HYDRAULIC DRAFT GEAR ARRANGEMENT

Original Filed March 15, 1965 6 Sheets-Sheet 1

INVENTOR
WILLIAM H. PETERSON,
BY Wam, Brown & McWilliams
ATT'YS

HYDRAULIC DRAFT GEAR ARRANGEMENT

Original Filed March 15, 1965 6 Sheets-Sheet 2

INVENTOR
WILLIAM H. PETERSON
BY Wm. Brown & W. Williams
ATT'YS

HYDRAULIC DRAFT GEAR ARRANGEMENT

Original Filed March 15, 1965 6 Sheets-Sheet 3

INVENTOR
WILLIAM H. PETERSON
BY Wenn, Brown & McWilliams
ATT'YS.

HYDRAULIC DRAFT GEAR ARRANGEMENT

Original Filed March 15, 1965 6 Sheets-Sheet 4

INVENTOR
WILLIAM H. PETERSON
BY Mann, Brown & McWilliams
ATT'YS.

HYDRAULIC DRAFT GEAR ARRANGEMENT

Original Filed March 15, 1965 6 Sheets-Sheet 5

INVENTOR
WILLIAM H. PETERSON
BY Mann, Brown & McWilliams
ATT'YS

HYDRAULIC DRAFT GEAR ARRANGEMENT

Original Filed March 15, 1965 6 Sheets-Sheet 6

INVENTOR
WILLIAM H. PETERSON
BY Wenn, Brown & McWilliams
ATT'YS.

United States Patent Office

Re. 26,472
Reissued Oct. 1, 1968

26,472

HYDRAULIC DRAFT GEAR ARRANGEMENT

William H. Peterson, Homewood, Ill., assignor to Pullman Incorporated, Chicago, Ill., a corporation of Delaware Original No. 3,275,164, dated Sept. 27, 1966, Ser. No. 533,751, Feb. 2, 1966, which is a continuation of Ser. No. 439,630, Mar. 15, 1965. Application for reissue Dec. 9, 1966, Ser. No. 607,348
12 Claims. (Cl. 213—43)

Matter enclosed in heavy brackets [ ] appears in the original patent but forms no part of this reissue specification; matter printed in italics indicates the additions made by reissue.

*ABSTRACT OF THE DISCLOSURE*

*A double acting hydraulic cushion device formed with a hydraulic filled cylinder and lengthwise spaced end plates. A piston assembly is disposed for relative reciprocation within said cylinder including a piston head and a piston rod extending from one face thereof through one of the end plate means. A flexible accumulator in the form of an expandible boot is fixed at one end to the end of the piston rod extending outwardly from the cylinder and at the other end to the end plate means. The device is provided with a metering means for controlling the flow of fluid from one side of the piston head to the other. Disposed in a bore extending from the piston head to the accumulator chamber is a pressure relief valve. A fluid pressure force responsive valve means is movably disposed in a chamber contiguous with the accumulator chamber for movement to a position overlying openings providing communication from the cylinder to the accumulator boot and a position clear of the openings to permit free fluid pasage.*

This is a continuation of United States patent application Serial No. 439,630, filed March 15, 1965.

My invention relates to a hydraulic draft gear arrangement for railroad cars, and more particularly, to a hydraulic draft gear arrangement providing cushioning for both buff and draft impacts during operation of a railroad car to which the arrangement is applied.

A significant problem in the hydraulic draft gear art lies in the fact that occasionally coupler impact situations will be encountered which will generate forces within the gear that can exceed the design strength of the gear. These situations may be caused by impacts at excessive speeds or impacts against a substantially fixed mass of excessive weight, such as a cut of three or more cars with their brakes set, or a combination of these factors.

A principal object of this invention is to provide a hydraulic draft gear arrangement that provides for an improved pressure relief valve arrangement which is incorporated within the confines of the gear piston head and rod, for relieving the pressures generated within the gear when extreme impact situations are encountered.

Another principal object of the invention is to provide a generally improved hydraulic cushioning device that is adaptable for both end of car and center of car cushioning arrangements.

Other objects of the invention are to provide a one piece piston head and rod arrangement that reduces machining of these parts to a minimum and eliminates the need for welding and its consequent distortions; to provide a hydraulic cushion arrangement that is especially adapted to handle overload situations, and to provide a hydraulic cushioning arrangement that is inexpensive of manufacture, convenient to install, and efficient in operation.

Other objects, uses, and advantages will be obvious or become apparent from a consideration of the following detailed description and the application drawings.

Figure 1:
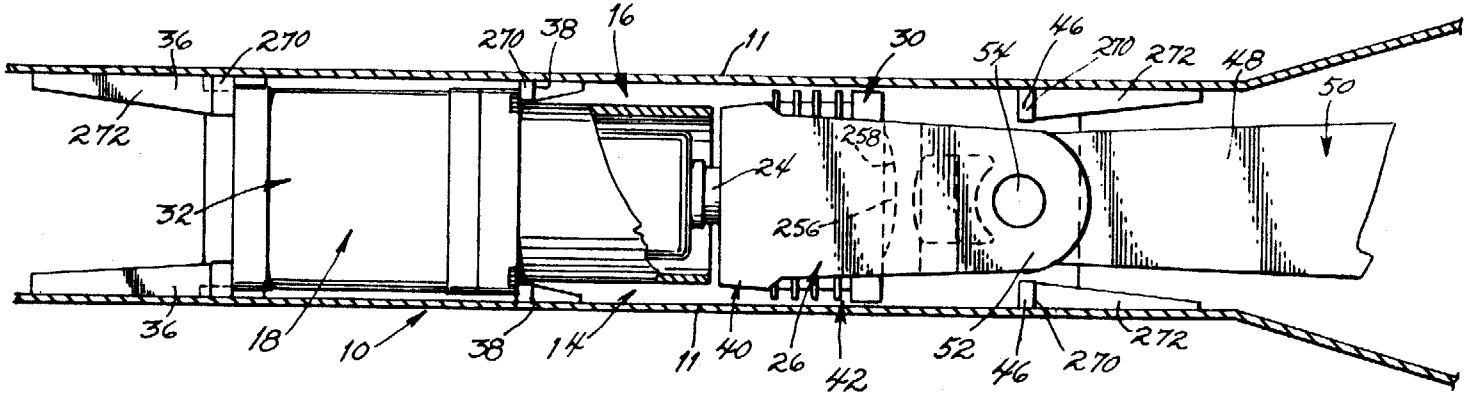
FIGURE 1 is a fragmental longitudinal horizontal sectional view taken through the draft sill of a railroad car, showing in plan one embodiment of the present invention, parts being broken away to expose other parts, and showing the draft gear in the position it assumes at the end of a buff impact on the coupler.

However, it is to be understood that the drawing illustrations are supplied primarily to comply with the requirements of 35 U.S.C. 112, and that the invention is susceptible of other embodiments that come within the scope of the appended claims.

GENERAL DESCRIPTION

Figure 2:
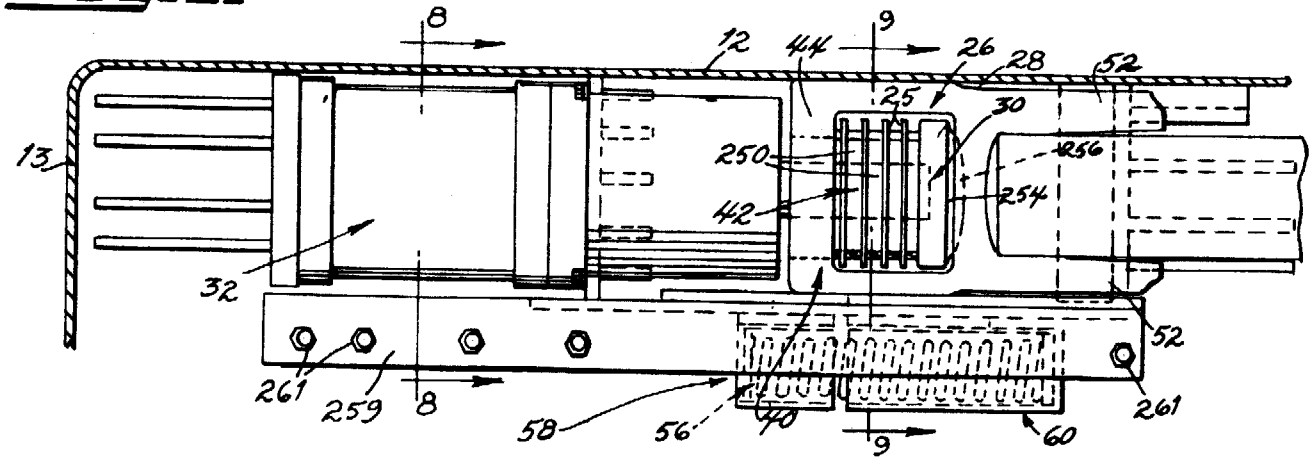
FIGURE 2 is a fragmental vertical sectional view through the draft sill of FIGURE 1, showing in elevation the draft gear in the position it assumes under the impact situation of FIGURE 1.

Referring first to FIGS. 1 and 2 of the drawings, reference numeral 10 generally indicates a conventional railroad car draft sill, which may comprise the end portion of the car body stationary or fixed center sill, or comprise a separate construction that is welded to the ends of such center sill, as is well known in the art.

The draft 10, which is shown in the drawings as comprising a pair of vertically disposed spaced side plates 11 welded to a top cover plate 12, defines a pocket 14 in which one embodiment 16 of the hydraulic draft gear arrangement of the present invention is mounted.

The draft gear arrangement 16 comprises a hydraulic cushioning device 18 (see FIGS. 3 and 4) that includes a piston member 20 defining a piston head 22 (see FIGS. 3 and 4) and a piston rod 24 which extends forwardly of the draft gear pocket into yoke 26 (FIGS. 1 and 2) where it is connected to follower plate 30 by a suitable screw threaded or other type of fixed connection.

The hydraulic cushioning device 18 further comprises a housing 32 in which is mounted a cylinder 34 (see FIGS. 4 and 5) in which the piston head 22 operates, with the housing 32 being applied in the draft gear pocket 14 between pairs of opposed lugs or stops 36 and 38 that are affixed to the draft sill 10, as by welding.

The yoke 26 is of a familiar type that defines a bight portion 40 in which is mounted a rubber pad type cushioning device 42 that is interposed between the rear 44 of the yoke bight portion and the follower plate 30. The follower plate 30 is proportioned laterally of the draft sill 10 to engage lugs or stops 46 [and] *in* the draft position of the draft gear arrangement 16.

The shank 48 of a coupler 50 is pivotally secured between the arms 52 of the yoke by a suitable coupler pin 54.

A compression spring 56 acting between a spring seat 58 that is fixed with respect to the draft sill and a spring seat 60 that is fixed with respect to yoke 26 maintains the draft gear arrangement in its draft position with follower 30 bearing against lugs 46.

Figure 4:
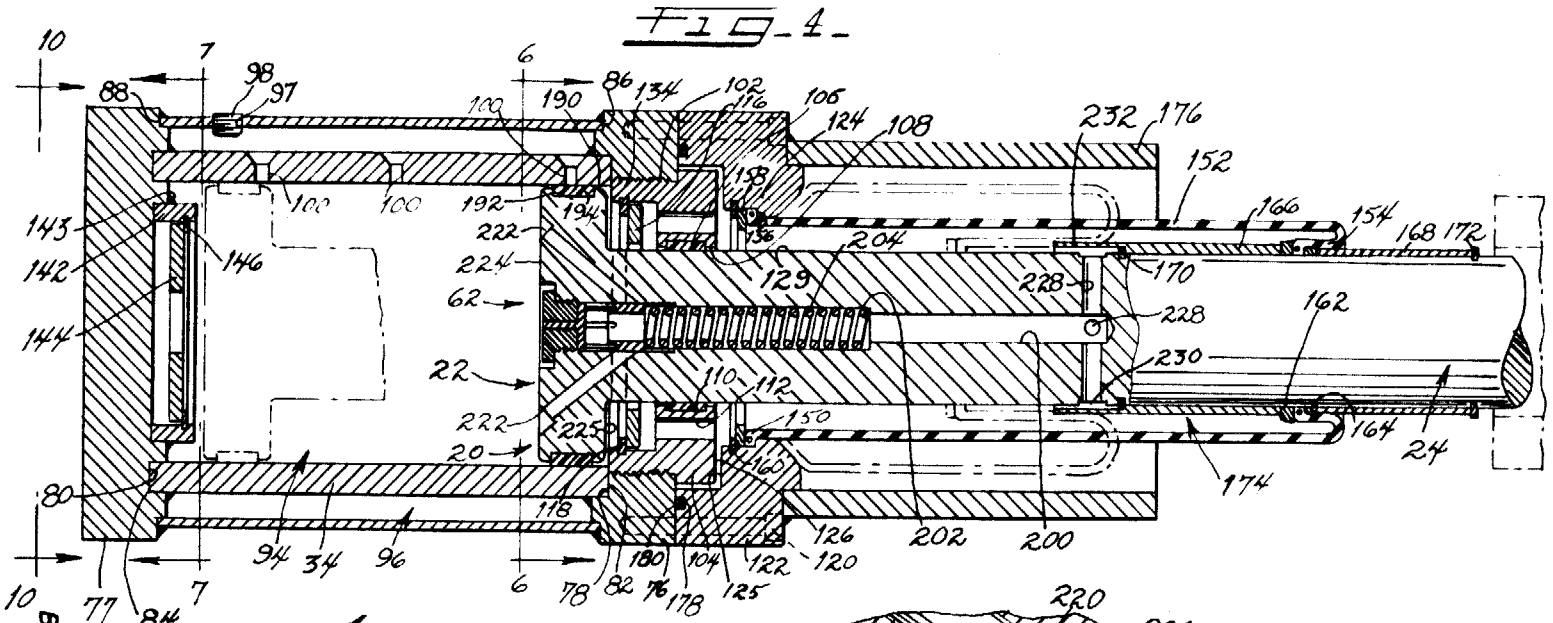
FIGURE 4 is a longitudinal sectional view through the hydraulic cushioning unit, with the full line showing of the piston indicating the location of the piston in draft, and the broken line showing of the piston indicating the location of the piston at the end of its buff stroke.

Draft forces acting on coupler 50 when the car is at a standstill are cushioned by the resilient pad cushioning device 42 while buff impact forces are cushioned by the hydraulic cushion device 18 through the piston member 20 moving from the full line position of FIG. 4 to the broken position of the same figure and forcing hydraulic liquid through orifices in dash pot like fashion, with the hydraulic cushioning device being arranged to offer a substantially constant resistance in absorbing the buff impact. After the buff impact is absorbed, spring device 56 returns the hydraulic cushioning unit to the draft position.

During running train operations there may be conditions in which a draft impact is imposed on the coupler immediately following a buff impact and prior to the return of the piston rod member 20 to the full line position of FIG. 4. Under such conditions of draft impact the hydraulic liquid is again forced through the orifices and the cushioning device offers a substantially constant resistance. Should the energy of the draft impact not be absorbed when the piston member returns to the full line position, the resilient pad cushioning device 42 may provide further cushioning.

Associated with the hydraulic cushioning unit 18 is a novel pressure relief valve device 62 (see FIGS. 3 and 4), which protects the hydraulic cushioning device against overload conditions caused by impacts at excessive speeds, or the like.

SPECIFIC DESCRIPTION

The specific features of hydraulic cushioning device 18 and its pressure relief valve 62 are shown in FIGS. 3–8 and 10–14.

The hydraulic cushioning device housing 32 comprises a shell or casing 70 of generally quadrilateral transverse cross-sectional configuration (see FIGS. 6 and 7), which may be defined by a pair of channel shaped members 72 welded together as at 74. Associated with the casing or shell 70 are forward and rearward end plates 76 and 77, which also mount between them cylinder 34 in which piston member 20 operates.

As indicated in FIG. 4, the end plates 76 and 77 are each formed wih recesses indicated at 78 and 80, respectively, in which the ends 82 and 84 of the cylinder 34 are respectively received. The end plates 76 and 77 are also recessed as at 86 and 88, respectively, to receive the respective ends 90 and 92 of the shell or casing. The end plates 76 and 77 are secured to the cylinder and shell or casing respectively by welding, as indicated in FIG. 4, although any other suitable means of securement that provides an effective hydraulic seal may be employed, as will be understood by those skilled in the art.

As clearly indicated by FIGS. 3, 4, 6 and 7, the cylinder 34 defines with the end plates 76 and 77 a working chamber 94 in which the piston member head 22 operates. The casing or shell 70 defines with cylinder 34 and end plates 76 and 77 an annular reservoir 96 for hydraulic liquid with which the cushioning device 18 is filled, as through a port 97 in shell or casing 70 (see FIG. 4) which may be sealed off by a suitable plug 98.

The cylinder 34 is preferably formed with a plurality of orifices 100 that are arranged to provide a substantially constant force travel characteristic when the piston member 20 is moved under both buff and draft impacts between the full line position of FIG 4 and the broken line position of that figure. This may be done in any conventional manner, as by making orifices 100 all of the same diameter and spacing them at the varying distances required, or by forming the orifices 100 of varying diameters and spacing them uniformly lengthwise of the cylinder all as required in accordance with known procedures in this art to achieve substantially constant force travel closure characteristics. As many orifices 100 may be provided in the cylinder 34 as may be required for efficient operation of cushioning device 18.

The front end plate 76 is formed to define a threaded opening 102 which threadedly receives an annular collar 104 through which the piston rod 24 extends. Interposed between the piston rod and the collar is a non-metallic ring 106 that is preferably formed of a laminated resin, such as the type designated by the National Electrical Manufacturers Association as 9 coarse, grade C. Preferably the plastic ring 106 as an I.D. that substantially complements the O.D. of the piston rod, and which is sufficiently less than the I.D. of the collar 104 at its annular opening 108 to avoid metal to metal contact between ring 106 and the piston rod 24. Ring 106 is seated in annular recess 110 of collar 104.

The collar 104 is also formed with a plurality of ports or passages 112 and an annular flange portion 114 that receives an annular flap valve plate 116 which is secured against displacement from flange portion 114 by a suitable locking ring 118.

Figure 3:
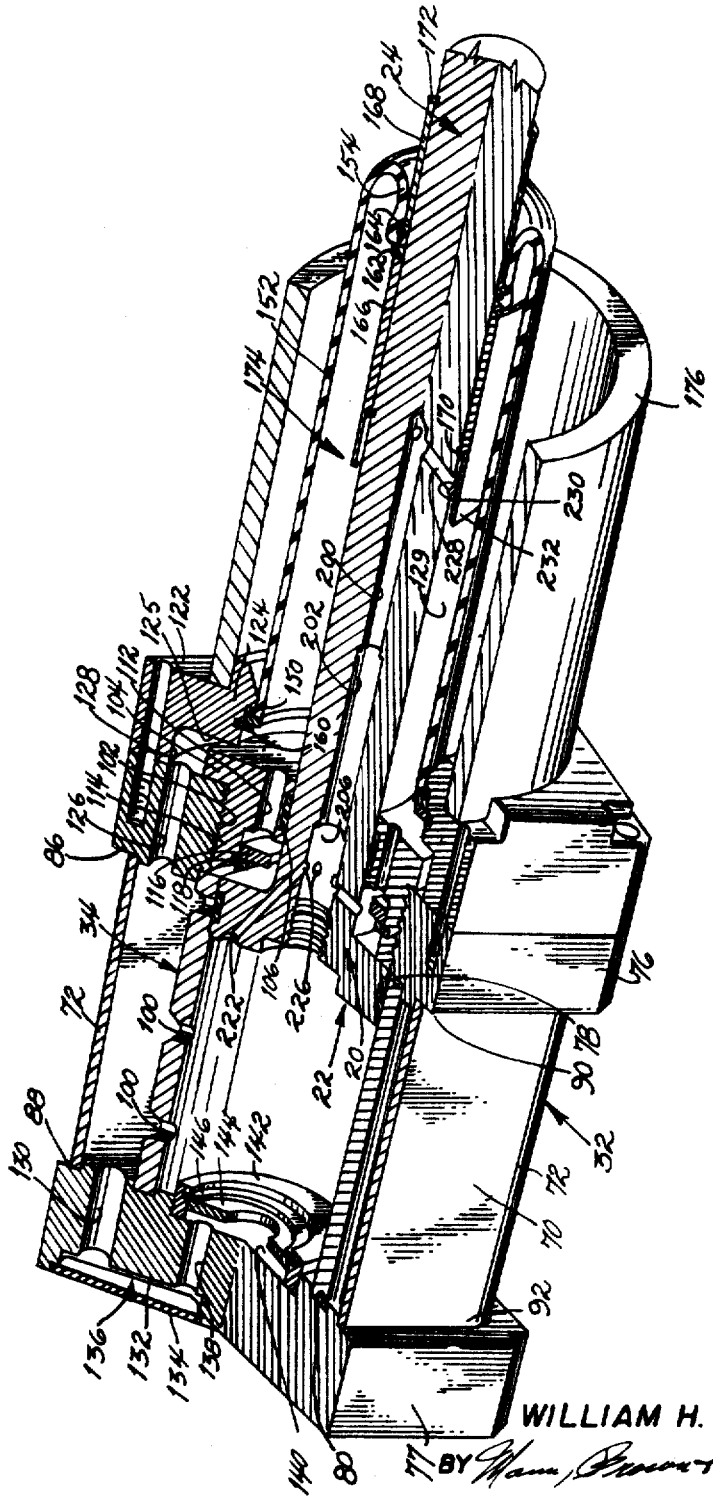
FIGURE 3 is a diagrammatic perspective view in section of the hydraulic cushioning unit that forms a part of the draft gear arrangement of FIGURES 1 and 2, parts being omitted to better illustrate other parts.

As indicated in FIGS 3 and 4, end plate 76 has secured thereto by appropriate bolts (indicated in dashed lines at 120 in FIG. 4) a base plate 122 that defines a radially inwardly extending annular ridge portion 124 through which piston rod 24 extends.

The base plate 122 on its rearward side defines a recess 125 that is quadrilateral in configuration and substantially complements the exterior transverse cross-sectional configuration of plate 122; recess 125 receives the collar 104 when the base plate 122 is secured to the end plate 76, as indicated in FIGS. 3 and 4. As the collar 104 is round or cylindrical in configuration, the base plate 122 recess 125 [refines] *defines* with the collar 104 at each of the four corners of the base plate 122 a passage 128 which in accordance with the present arrangement is aligned with a correspondingly placed passage 126 formed in the end plate 76 in the manner suggested in FIG. 3. This provides for hydraulic liquid communication between the reservoir 96 and external surface 129 of the piston rod 24 exteriorly of the [car] *collar* 104 through the four corners of the abutting plates 76 and 122. Hydraulic liquid communication is also provided for between the same portion of the piston rod 24 and the chamber 94 through ports 112 of collar 104 and around flap plate 116, when the flap plate 116 is not seated in check valve closing relation over the ends of the ports 112 (plate 116 is proportioned to do this, as indicated in FIG 4).

Figure 10:
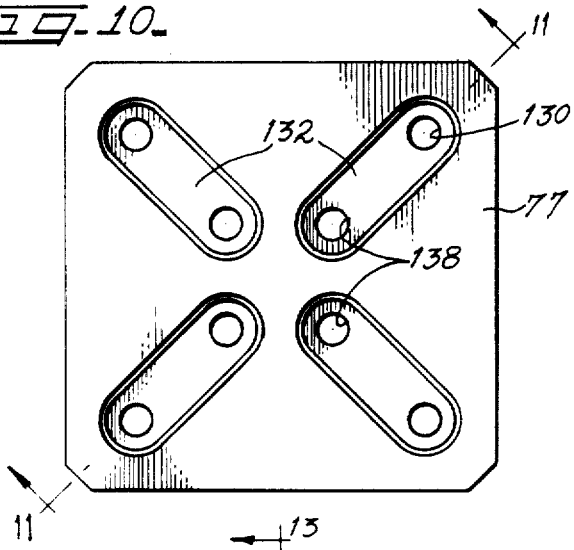
FIGURE 10 is a plan view of the rear end plate of the hydraulic cushioning device, with the cover plates that are indicated in FIGURE 3 being omitted.
Figure 11:
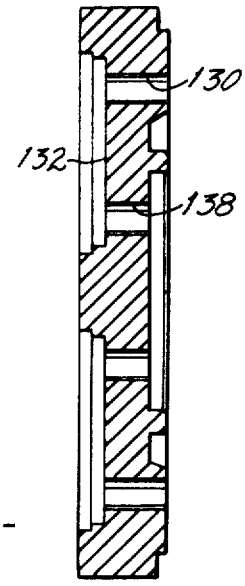
FIGURE 11 is a cross-sectional view substantially along line 11—11 of FIGURE 10.
Figure 12:
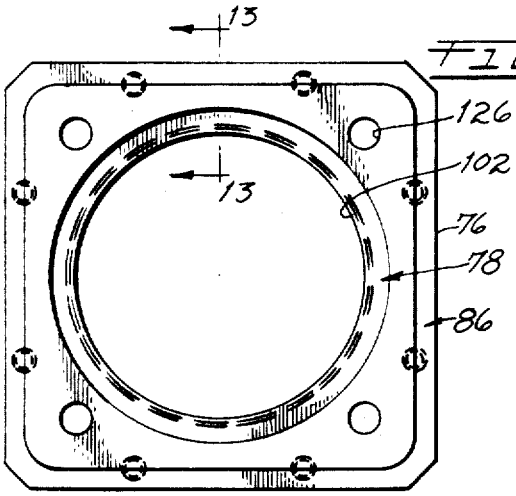
FIGURE 12 is a plan view of the forward end plate of the hydraulic cushioning device, showing the rear side thereof.
Figure 13:
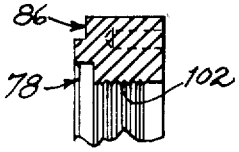
FIGURE 13 is a fragmental cross-sectional view substantially along line 13—13 of FIGURE 12.
Figure 14:
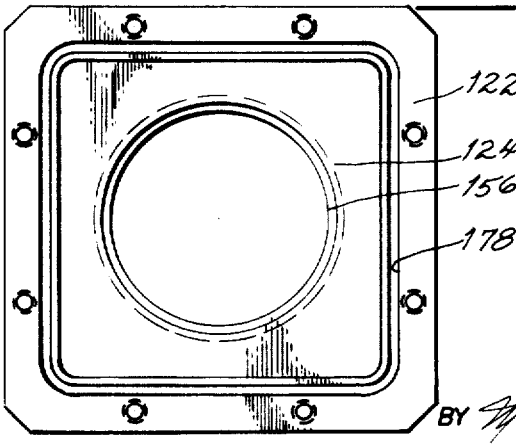
FIGURE 14 is a plan view of the front base plate of the hydraulic cushioning device, showing the rearward face thereof.

End plate 77 at each of its four corners is provided with a passage 130 which provides hydraulic liquid communication between reservoir 96 and recesses 132 which are formed at each corner (see FIGS. 3, 10 and 11). Each recess 132 is sealed shut by welding in place an appropriate cover element 134, and each recess 132, which with the cover plate 134 defines a passage 136, communicates with chamber 94 through a passage 138 formed in the end plate 77.

As indicated in FIGS. 3 and 11, the passages 138 terminate in an annular recess 140 formed in the forward face of end plate 77 in which an annular member or ring 142 is fixed, as by welding at 143. Annular member or ring 142 has mounted therein an annular flap valve plate 144 which is secured against displacement within the ring 142 by a suitable locking ring 146. The locking ring 146 is spaced lengthwise from the ring 142 so that the flap valve plate 144 is displaceable from a closed position overlying the passage 138 to a position clear thereof against the ring 142.

Thus, hydraulic liquid communication is provided between reservoir 96 and chamber 94 through passages 130, 136, 138, when flap valve plate 144 is displaced from check valve closing relation with respect to passages 138. Flap valve plate *144* [142] is proportioned to overlie the passages 138, as indicated in FIG. 3.

It will thus be seen that the end plates 76, 77 and base plate 122 are quadrilateral in transverse cross-sectional configuration and are provided with hydraulic liquid conducting passageways at their four corners.

Secured to the annular ridge portion 124 of base plate 122 is one end 150 of an annular flexible static seal member or boot accumulator 152 that has its other end 154 turned outside in, with said end 154 being secured to the piston rod 24.

In the case of the boot end 150, this end is locked between a shoulder 156 and a ring 158 held in place by a suitable locking ring 160, while in the case of the boot end 154, it is held in place by being secured between a pair of annular members 162 and 164 against which abut the respective sleeves 166 and 168 that are held in place by suitable locking rings 170 and 172, respectively. Parenthetically, all locking rings referred to herein, such as rings 170 and 172, are seated in appropriate recesses, in accordance with standard practice in connection with such devices.

The annular static seal member or boot 152 thus defines with the piston rod 24 an annular hydraulic liquid receiving chamber 174.

Base plate 122 has affixed thereto as by welding an annular extension ring or cylinder 176, which is proportioned to overlie the boot 152 when the hydraulic cushion device 18 is in its contracted relation (see the dashed line showing of FIG. 4).

Base plate 122 is formed with an endless recess 178 about its recess 125 which receives a suitable O-ring seal 180 for insuring a hydraulic liquid seal between the base plate 122 and end plate *76* [176] (see FIG. 4). This has been omitted from the showing of FIG. 3 to simplify the drawing of that figure.

The piston member 20 in accordance with this invention is a one piece element formed from a suitable forging steel or the like to permit the piston head 22 to be formed to a suitable piston head configuration by an appropriate forging operation. One suitable material for this purpose is C–1050 Steel, normalized and of a suitable forging quality.

The rim 190 of the piston head is suitably machined to form annular recess 192 in which a laminated plastic ring 194 is mounted. Ring 194 is preferably made of the same substance as ring 106, and preferably has an O.D. that exceeds that of piston head rim 190 sufficiently to prevent metal to metal contact between piston head 22 and cylinder 94.

The piston rod 24 may be appropriately threaded at its other end for reception in a threaded socket formed in the mid portion of follower 30, for securing same to the follower 30.

Figure 5:
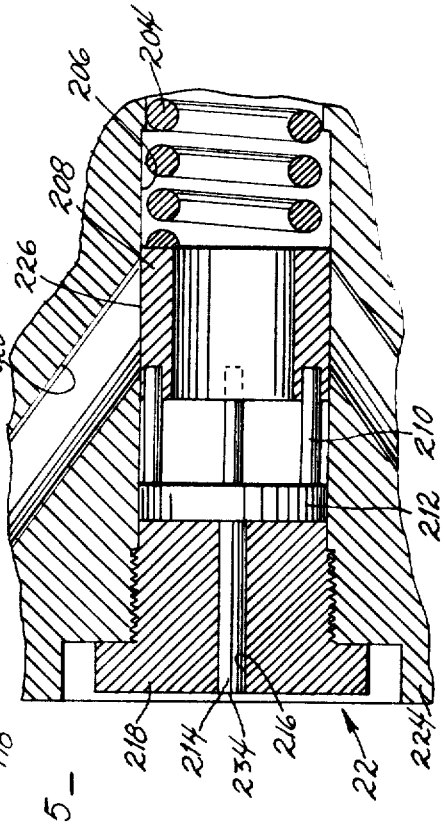
FIGURE 5 is a fragmental large scale sectional view illustrating a portion of the piston pressure relief valve that is shown in FIGURE 4.
Figure 6:
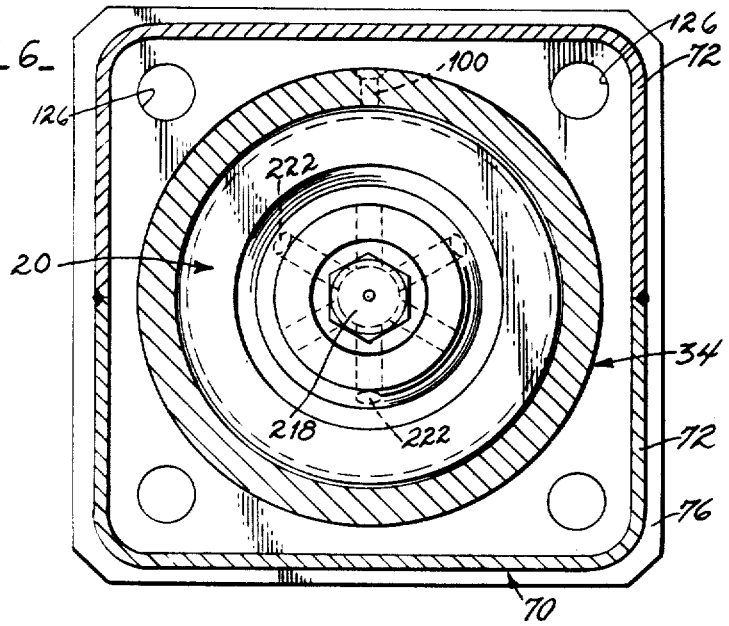
FIGURE 6 is a cross-sectional view substantially along line 6—6 of FIGURE 4.
Figure 7:
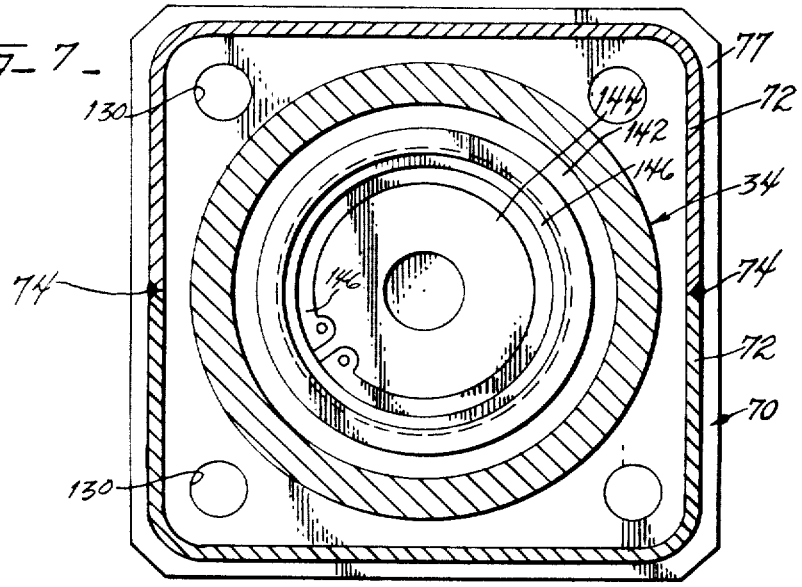
FIGURE 7 is a cross-sectional view substantially along line 7—7 of FIGURE 4.

The pressure relief valve 62 in accordance with this invention is mounted entirely within the piston member 20. As indicated in FIGS. 3, 4 and 5, the piston member 20 is formed with a longitudinally extending bore 200 that is counterbored as at 202 to receive compression spring 204 which extends into a cylindrical valve chamber 206 in which is slidably mounted an annular valve stem member 208 that preferably has an O.D. that substantially complements the I.D. of the chamber 206. Fixed to the tubular valve stem member 208 are a plurality of studs or pins 210 that extend longitudinally of the axis of bore 200 and chamber 206 and bear against a disc 212 that has secured thereto a pin 214 which also extends longitudinally of the axes of bore 200 and chamber 206. The pin 214 is slidably mounted within a bore 216 formed in a retainer nut 218 that is threadedly mounted at the piston head end of chamber 206.

The piston member 20 is formed with a plurality of diagonal passages 220 defining inlet ports 222 at the working face or high pressure side 224 of the piston head 22 and exhaust ports 226 opening into chamber 206.

The bore 200 communicates with a plurality of cross bores 228 that extend transversely of the piston rod 24 and terminate in exhaust ports 230 which are directed laterally of the piston rod. As indicated in FIG. 4, the sleeve 166, in accordance with this invention, is preferably formed with an extension 232 which overlies the ports 230 and deflects hydraulic liquid discharge from ports 230 to the *left* [right] of FIG. 4 rather than directly against the static seal member 152.

Spring 204 is selected to have a strength such as to hold the tubular valve stem member 208 substantially in the position shown in FIG. 5 during normal operation of the gear on cushioning buff and draft forces. However, the strength is selected such that when excessive buff impact conditions cause pressures to rise in chamber 94 to about 85 to 90 percent of the strength of cylinder 34, the pressure acting on the end 234 of pin 214 will force stem 208, through disc 212 and pins 210, to the right of FIG. 5 to the extent that ports 226 will be opened to chamber 206 and thus to bore 200 through the hollow center of the helical spring 204. This permits hydraulic liquid to discharge through the relief valve 62 and to chamber 174, and thus relieve the excess pressures building up in cylinder 94.

The arrangement of valve 62 as illustrated and described permits the use of a spring with a relatively light preload to adequately protect the hydraulic cushion unit. For instance, spring 204 can be arranged to have a preload as light as on the order of two hundred and eighty pounds, and yet hold the valve 62 closed up to pressures on the order of twelve thousand p.s.i. in chamber 94. A suitable spring for this purpose is formed from Vanadium Steel or its equivalent into four gauge wire size and provided with a spring rate of 131.6 pounds per inch with twenty-six active coils and an outside diameter of one and one-quarter inches.

In use, the hydraulic cushioning unit 18 is fully charged with hydraulic liquid in the spaces defined by the reservoir 96, the chamber 94, the chamber 174, and all passages connecting same. This may be done in any suitable manner, but care should be taken to have all air bled out of the sysetm while at the same time avoiding overcharging of the unit. The boot 152 should be disposed substantially as shown in the full lines of FIGURE 4 when properly charged with hydraulic liquid.

In normal buff impact absorbing operation, the piston member 20 moves from the full line position to the broken line position of FIG. 4, and the valve 62 remains closed. As the piston head moves between these two positions, hydraulic liquid discharges from chamber 94 through the orifices 100 into reservoir 96 and returns to the chamber 94 on the other side of the piston head 22 through the orifices 100 that the piston head 22 has passed, as well as through passages 126, 128, 112 and valve plate 116. Flap valve plate 144 under the pressure build up before piston side 224 shuts off the passages 138 in the end plate 77. This hydraulic liquid flow continues until the piston head reaches its maximum extent of buff absorbing travel (approximately the broken line position of FIG. 4) during which travel there is provided a substantially constant cushioning force. If the buff impact is applied on the coupler 50 when the car is at a standstill, the compression spring 56 acting on yoke 26 and therefore on piston rod 24 draws the piston member 20 to the right of FIG. 4 and reverses the hydraulic liquid flow from chamber 94.

During train running or moving conditions a draft impact or force may act on the couplers 50 when the piston member 20 is in the broken line position as a result of a prior buff impact. Under these conditions the hydraulic liquid flow will then be from the side 225 of piston head 22 through the orifices 100 on the high pressure piston side 225 and to reservoir 96 and then back into chamber 94 through those of the orifices 100 that have been opened by the movement to the right of FIG. 4 of the piston member 20. Such flow of the hydraulic liquid will result in a substantially constant cushioning force because of the spacing of the orifices 100. Also, flap valve plate 116 will close off passages 112 and hydraulic liquid flow will occur between reservoir 96 and chamber 94 through passages 130, 136 and 138 of end plate 77 [177] and past flap valve plate 144.

From the foregoing it should be readily apparent that the hydraulic cushioning unit 18 is double-acting by providing cushioning during both draft and buff impact.

One function of the accumulator or the flexible static seal 152 is to form an accumulator chamber to take the hydraulic liquid displaced from chamber 94 by the entry of the piston rod 24 into same, and as indicated by the broken line showing of FIG. 4, the seal member 152 expands somewhat under the pressure of the additional hydraulic liquid discharged into the chamber 174. The member 152 is made sufficiently resilient so that as the piston member 20 returns to the full line position of FIG. 4, it tends to aid in discharging hydraulic liquid from chamber 174 back through the passages 128 and 126 and into reservoir 96, etc. Chamber 174 also serves as a surge chamber to take care of excessive pressure increases in reservoir 96; pressures in reservoir 96 are relieved through passages 126 and 128.

The cushioning devices 42 (FIGS. 1 and 2) comprise a plurality of rubber pads 250 which are adhered to the opposite sides of metallic separating plates or discs 252. As indicated in FIG. 9, the piston rod 24 passes through the cushion device 42, and as already indicated, the cushion device 42 abuts against follower 30 to which the piston rod 24 is secured.

Follower plate 30 is formed on its outwardly facing surface 254 with a spherically contoured projection 256 (see FIG. 2) which seats within a complementarily shaped concave surface or seat 258 formed in the yoke 26.

Figure 8:
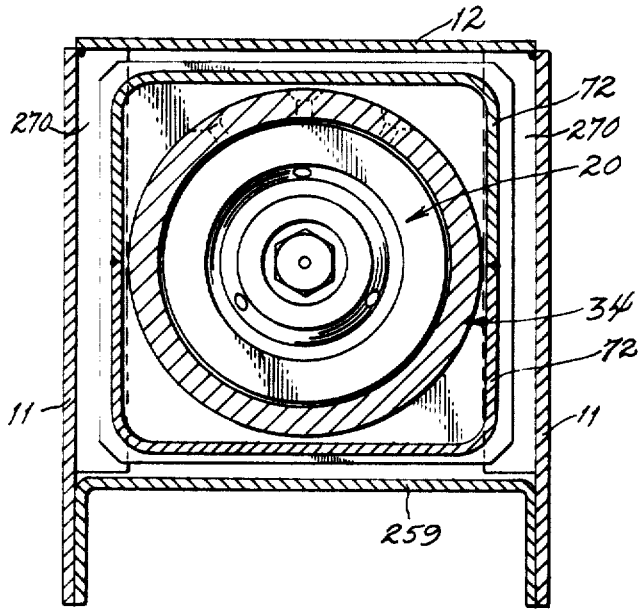
FIGURE 8 is a cross-sectional view substantially along line 8—8 of FIGURE 2.
Figure 9:
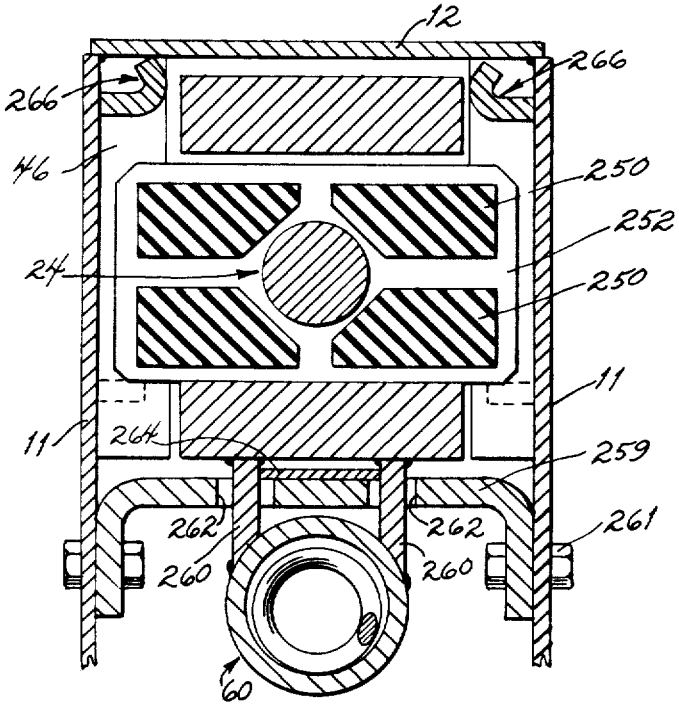
FIGURE 9 is a cross-sectional view substantially along line 9—9 of FIGURE 2.

The spring seat 58 is affixed in any suitable manner, as by welding, to the bottom of the draft gear pocket bottom closure plate 259 that is fixed between the draft sill side walls 11 as indicated in FIGS. 8 and 9. Plate 259 as illustrated is in the form of a channel shaped member fixed in place by appropriate bolts 261.

Spring seat 60 is secured to the yoke by being affixed to spaced plates 260 (see FIG. 9) that operate in slots 262 formed in closure plate 259, and are themselves affixed to the yoke substantially in the manner indicated in FIG. 9. A suitable strengthening and motion guiding web 264 may be affixed between the plates 260 substantially in the manner indicated in FIG. 9.

The movement of the yoke may be guided laterally by providing appropriate guide members within the draft sill where indicated at 266 in FIG. 9.

The lugs or stops 36, 38 and 46 may be of the type commonly used in draft gear pockets and comprise suitable abutments 270 affixed in place as by welding and reinforced by appropriate strengthening webs 272. Different sizes and shapes of these elements for the respective lugs or stops 36, 38, and 46 are indicated in the drawings, but the functions of these elements are the same, as will be immediately apparent to those skilled in the art.

The specific draft sill structure shown in the drawings is adapted for use in a railway car having a floor height wherein a portion of the draft sill is elevated above the floor. To this end, the rear end wall 13 of the cover plate 12 depends downwardly to the car floor level, as indicated in FIG. 2.

The draft gear arrangement 16 includes a number of improvements in addition to the relief valve 62.

As already mentioned in connection with the hydraulic cushioning device, the piston member 20 is a one piece element, which eliminates the need to weld the piston head on a piston rod and the consequent distortions due to heat treating in welding.

Furthermore, it will be noted that the boot 152 not only serves to accumulate the hydraulic liquid displaced from the chamber 94 by the full entry of the piston rod into that chamber, but it also serves as a surge chamber to minimize forces within the reservoir 96 and the chamber 94 during displacement of the hydraulic liquid by the piston 20.

The piston arrangement also eliminates to a considerable extent the machining that has formerly been required in connection with components of this type.

The relief valve is simple and reliable and does not require a sensitive adjustment to adapt it to its desired working conditions. The relief valve is entirely housed within the piston member, thus is not only compactly arranged but fully protected during use.

Reference is hereby made to my copending application Serial No. 310,661, filed September 23, 1963, and the copending application Serial No. 369,708, filed May 25, 1964, of myself and Carl Adler, the disclosures of which are hereby incorporated herein by this reference.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

What is claimed is:

1. A hydraulic cushioning device for draft gear or the like and operative to cushion buff and draft impacts comprising:

a housing, a cylinder mounted in said housing, a piston member reciprocably mounted in said cylinder, said piston member comprising a piston head positioned in said cylinder and a piston rod projecting outwardly of said cylinder, said piston head including a high pressure generating side upon buff impact to said cushion device, said piston head and rod being a one piece piston member, means for effecting a hydraulic liquid seal between said rod and said housing, pressure relief valve means carried by said piston member, said relief valve means comprising:

a bore formed in said rod and extending longitudinally thereof and inwardly of the head end thereof, a valve member reciprocably mounted in said bore and proportioned to substantially complement the width of said bore, resilient means biasing said valve member outwardly of said bore, stop means for limiting the movement of said member outwardly of said bore, and an actuator member shiftably mounted in said head and having one end thereof operably engaging said valve member and the other end thereof exposed at said high pressure side of said piston head, said resilient means being prestressed to position said valve member at predetermined positions, said piston head being formed with conduit means extending between said high pressure side thereof and the position of said valve member when in its said predetermined position, and accumulator means operably connected with said bore inwardly of said relief valve means, said actuator member shifting said valve member against the action of said resilient means to place said piston head conduit means into communication with said accumulator means when said piston head high pressure side is subjected to pressures above a predetermined maximum.

2. A hydraulic cushioning device for draft gear or the like and operative to cushion buff and draft impacts, said device comprising:

a cylinder, a piston member reciprocably mounted in said cylinder, said piston member comprising a piston head positioned in said cylinder and a piston rod projecting outwardly of said cylinder, said piston head including a high pressure generating side upon buff impact to said cushion device, means for effecting a hydraulic liquid seal between said rod and said cylinder, and pressure relief valve means carried by said piston member, said relief valve means comprising:

a bore formed in said rod and extending longitudinally thereof and inwardly of the head end thereof, a valve member reciprocably mounted in said bore and proportioned to substantially complement the width of said bore, resilient means biasing said valve member outwardly of said bore, stop means for limiting the movement of said member outwardly of said bore, and an actuator member shiftably mounted in said head and having one end thereof operably engaging said valve member and the other end thereof exposed at said high pressure side of said piston head, said resilient means being prestressed to position said valve member at a predetermined position, said piston head being formed with conduit means extending between said high pressure side thereof and the position of said valve member when in its said predetermined position, and accumulator means operably connected with said bore inwardly of said relief valve means.

3. A hydraulic cushioning device for draft gear or the like and operative to cushion buff and draft impacts, said device comprising:

a housing, a cylinder mounted in said housing, a piston member reciprocably mounted in said cylinder, said piston member comprising a piston head positioned in said cylinder and a piston rod projecting outwardly of said cylinder, said piston head including a high pressure generating side upon buff impact to said cushion device, means for effecting a hydraulic liquid seal between said rod and said housing, pressure relief valve means carried by said piston member, said relief valve means comprising:

a bore formed in said rod and extending longitudinally thereof and inwardly of the head end thereof, a tubular valve stem member reciprocably mounted in said bore and proportioned to substantially complement the width of said bore, a spindle valve member mounted in said bore and actuated by said valve stem, resilient means biasing said valve stem member outwardly of said bore, stop means for limiting the movement of said members outwardly of said bore, and an actuator member shiftably mounted in said head and having one end thereof operably engaging said spindle valve member and the other end thereof exposed at said high pressure side of said piston head, said resilient means being prestressed to position said valve stem and said spindle valve members at predetermined positions, said piston head being formed with conduit means extending between said high pressure side thereof and the position of said valve stem member when in its said predetermined position, and accumulator means operably connected with said bore inwardly of said relief valve means.

4. A hydraulic cushioning device for hydraulic draft gear or the like and operative to cushion buff and draft impacts, comprising:

a housing, a cylinder mounted in said housing and defining a hydraulic chamber, a piston member reciprocably mounted in said cylinder chamber, said piston member comprising a piston head positioned in said cylinder chamber and a piston rod projecting outwardly of one end of said housing, said piston head including a high pressure generating side upon buff impact to said cushion device, said piston head and rod being a one piece piston member, with the space between said housing and said cylinder comprising a hydraulic liquid reservoir, orifice means formed in said cylinder at points spaced axially of said cylinder for providing communication between said space and said cylinder chamber, means for effecting a hydraulic liquid seal between said rod and said one end of said housing, pressure relief valve means carried by said piston member, said relief valve means comprising:

a bore formed in said rod and extending longitudinally thereof and inwardly of the head end thereof, a tubular valve stem member reciprocably mounted in said bore and proportioned to substantially complement the width of said bore, a spindle valve member mounted in said bore and actuated by said valve stem, resilient means biasing said valve stem member outwardly of said bore, stop means for limiting the movement of said members outwardly of said bore, and an actuator member shiftably mounted in said head and having one end thereof operably engaging said spindle valve member and the other end thereof exposed at said high pressure side of said piston head, said resilient means being prestressed to position said valve stem and said spindle valve members at predetermined position, said piston head being formed with conduit means extending between said high pressure side thereof and the position of said valve stem member when in its said predetermined position, and accumulator means operably connected with said bore inwardly of relief valve means.

5. The device set forth in claim 4 wherein said housing includes an end plate structure at each end of said cylinder forming the ends of said cylinder, said end plate structure of said one end of said housing being formed to define conduit means communicating with said reservoir, and means for defining an annular hydraulic liquid accumulator chamber about said piston rod exteriorly of said housing, said accumulator chamber comprising said accumulator means, said conduit means communicating with said chamber.

6. The device set forth in claim 5 wherein said end plate structure at said housing one end includes a collar portion proportioned to receive said piston rod, and dynamic seal means interposed between said collar and said rod, said collar portion being formed to define conduit means communicating between said accumulator chamber and said cylinder chamber, and check valve means operably connected with said collar portion conduit means for blocking hydraulic liquid flow therethrough toward said accumulator chamber.

7. The device set forth in claim 6 wherein:

said accumulator chamber defining means comprises a resiliently flexible annular member having one end thereof secured to said housing one end and the other end thereof secured to said piston rod, said flexible annular member comprising said hydraulic liquid seal effecting means.

8. The device set forth in claim 5 wherein:

said end plate structure at the other end of said housing includes conduit means communicating between said reservoir and said cylinder chamber and check valve means operably connected therewith for blocking hydraulic liquid flow from said cylinder chamber to said reservoir.

9. A draft gear arrangement for railway cars, said arrangement comprising:

a hydraulic cushioning device, said device comprising:

a housing, a cylinder mounted in said housing and defining a hydraulic chamber, a piston member reciprocably mounted in said cylinder chamber, said piston member comprising a piston head positioned in said cylinder chamber and a piston rod projecting outwardly of one end of said housing, said piston head including a high pressure generating side upon buff impact to said cushion device, said piston head and rod being a one piece piston member, with the space between said housing and said cylinder comprising a hydraulic liquid reservoir, orifice means formed in said cylinder at points spaced axially of said cylinder for providing communication between said space and said cylinder chamber, means for effecting a hydraulic liquid seal between said rod and said one end of said housing, pressure relief valve means carried by said piston member, said relief valve means comprising:

a bore formed in said rod and extending longitudinally thereof and inwardly of the head end thereof, a valve member reciprocably mounted in said bore and proportioned to substantially complement the width of said bore, resilient means biasing said valve member outwardly of said bore, stop means for limiting the movement of said valve member outwardly of said bore, and an actuator member shiftably mounted in said head and having one end thereof operably engaging said valve member and the other end thereof exposed at said high pressure side of said piston head, said resilient means being prestressed to position said valve member a predetermined position, said piston head being formed with conduit means extending between said high pressure side thereof and the position of said valve stem member when in its said predetermined position, and accumulator means operably connected with said bore inwardly of said relief valve means, said housing being fixed with respect to the car, said rod being connected to a yoke member, said yoke member being mounted for movement longitudinally of the car between a buff limit position inwardly of the car and a draft limit position outwardly of the car, said draft limit position being defined by stop means fixed with respect to the car, and resilient cushioning means carried by said yoke and interposed between the last mentioned stop means and said yoke.

*10. The device set forth in claim 3 in which*

*the housing includes first and second end plate means at opposite ends of the cylinder,*

*the piston head divides the cylinder into a first chamber and a second chamber,*

*said second chamber contains the piston rod,*

*the piston rod is connected at one end to the piston head and extends through said first end plate means,*

*the accumulator means is resilient and is fixed between the first end plate means and the piston rod for receiving hydraulic fluid displaced by the piston head during travel of the head and rod in the cylinder,*

*the pressure relief valve means is yieldable to pressure force in said first chamber to permit hydraulic fluid flow through the bore into the accumulator means,*

*the cylinder includes hydraulic fluid metering means for controlling the flow of hydraulic fluid between said two chambers in both directions of travel of the piston head so as to impart predetermined cushion characteristics to the device,*

*means is provided establishing communication between said first chamber and said accumulator means including said metering means and an opening in said first end plate means,*

*and valve means is movably disposed in said second chamber for interaction with said opening so as to be responsive to differential fluid forces acting on said valve means to move said valve means to a position restricting hydraulic fluid flow through said opening when the piston head moves toward said first end plate means,*

*and to a position permitting free flow from said accumulator means through said opening when said piston head moves in the opposite direction.*

*11. A hydraulic cushioning device for draft gear or the like and operative to cushion buff and draft impacts, said device comprising*

*a housing providing a hydraulic fluid filled cylinder having first and second end plate means at opposite ends of the cylinder,*

*a piston head dividing the cylinder into a first chamber and a second chamber,*

*a piston rod in said second chamber connected at one end to the piston head, extending through said first end plate means and having a longitudinal bore therein,*

*resilient accumulator means fixed between the first end plate means and the piston rod for receiving hydraulic fluid displaced by the piston head and rod during travel of the head and rod in the cylinder,*

*pressure relief valve means carried by the piston head and yieldable to pressure force in said first chamber to permit hydraulic fluid flow through the bore into the accumulator means,*

*said cylinder including hydraulic fluid metering means for controlling the flow of hydraulic fluid between the two chambers in both directions of travel of the piston head so as to impart predetermined cushion characteristics to the device,*

*means establishing communication between said first chamber and said accumulator means inluding said metering means and an opening in said first end plate means,*

*and valve means movably disposed in said second chamber for interaction with said opening so as to be responsive to differential fluid forces acting on said valve means to move said valve means to a position restricting hydraulic fluid flow through said opening when the piston head moves toward said first end plate means,*

*and to a position permitting free flow from said accumulator means through said opening when said piston head moves in the opposite direction.*

*12. The device set forth in claim 11 in which the hydraulic fluid metering means comprises passages in the wall of the cylinder establishing progressively varying restricted communication between the two chambers as the piston head moves in the cylinder.*

References Cited

The following references, cited by the Examiner, are of record in the patented file of this patent or the original patent.

UNITED STATES PATENTS

| | | | |
|---|---|---|---|
| 3 215,283 | 11/1965 | Shaver | 213—43 |
| 3,257,000 | 6/1966 | Cope | 213—43 |
| 2,816,670 | 12/1957 | Edwards et al. | 213—43 |
| 2,994,442 | 8/1961 | Frederick | 213—43 |
| 3,033,384 | 5/1962 | Zanow et al. | 213—43 |
| 3,150,783 | 9/1964 | Campbell et al. | 213—43 |
| 3,175,699 | 3/1965 | Price et al. | 213—43 |
| 3,190,458 | 6/1965 | Zanow | 213—43 |
| 3,193,112 | 7/1965 | Karakashjan et al. | 213—43 |
| 3,207,324 | 9/1965 | Blake | 213—8 |
| 3,232,443 | 2/1966 | Smith | 213—8 |
| 3,240,355 | 3/1966 | Karbowniczek | 213—43 |
| 3,301,410 | 1/1967 | Seay | 213—43 |

DRAYTON E. HOFFMAN, *Primary Examiner.*